United States Patent [19]

Thorsell et al.

[11] 4,211,134
[45] Jul. 8, 1980

[54] SELF-ALIGNING FENCE FOR RADIAL ARM SAW

[75] Inventors: Roland H. Thorsell; Stoddard H. Pyle, both of Corvallis, Oreg.

[73] Assignee: Excor, Inc., Corvallis, Oreg.

[21] Appl. No.: 24,174

[22] Filed: Mar. 26, 1979

[51] Int. Cl.³ .................... B27B 5/20; B23D 47/02
[52] U.S. Cl. .................... 83/471.3; 83/477; 83/486.1; 83/581; 83/522; 83/467 R
[58] Field of Search .................... 83/477, 471.3, 471.2, 83/486.1, 486, 581, 522, 467, 468

[56] References Cited

U.S. PATENT DOCUMENTS

| | | | |
|---|---|---|---|
| 3,192,814 | 7/1965 | Zimmerman | 83/467 |
| 3,302,667 | 2/1967 | Edler | 83/471.3 |
| 3,853,028 | 12/1974 | Jägers | 83/467 X |
| 3,910,142 | 10/1975 | Jureit et al. | 83/471.3 X |
| 3,931,962 | 1/1976 | Delplanque | 83/471.3 X |
| 4,036,093 | 7/1977 | Thorsell | 83/471.3 |
| 4,077,290 | 3/1978 | Hreha | 83/471.2 |

*Primary Examiner*—Donald R. Schran
*Attorney, Agent, or Firm*—D. Paul Weaver

[57] ABSTRACT

A radial arm saw has a vertical rotational axis which is displaceable from the plane of the work fence through predetermined distances. A mechanism is provided through which the work fence will be automatically shifted on a linear path in response to angular rotation of the radial arm saw about its vertical axis of rotation through a distance proportional to the degree of angular rotation. The mechanism includes a carriage and linear slide arrangement for the work fence and a proportional cam actuator for the carriage on a turntable of the radial arm saw.

12 Claims, 6 Drawing Figures

… …

SELF-ALIGNING FENCE FOR RADIAL ARM SAW

BACKGROUND OF THE INVENTION

When the axis of angular rotation of a radial arm saw is located in spaced relationship to a plane defined by the relatively stationary work fence, the fence will be intersected by the rotating saw blade at various points along the fence, depending upon the angle of cut. When such a saw is employed for the mass production of truss lumber or the like, the fence is soon cut at so many locations that its strength is lessened and it may represent a hazard to the sawyer, particularly while cutting short material.

Accordingly, the objective of this invention is to provide an arrangement in a radial arm saw to automatically shift the work-engaging fence along a linear path in one direction or the other automatically in response to angular displacement of the saw and its turntable about the vertical axis of rotation of the saw and turntable. Such automatic linear displacement of the work fence relative to the rotational axis of the saw turntable eliminates cutting through the fence at multiple points while sawing at different angles and causes the saw blade clearance gap in the fence to always be positioned properly to allow passage therethrough of the saw blade at any working angle of the latter.

More particularly, in accordance with the invention, the entire turntable and support of the radial arm saw may be accurately adjusted, preferably by the operation of screw-threaded means, so that the turntable rotational axis may coincide with or may be spaced a precise distance in front of the plane defined by the work fence. Preset limit stops may be employed to define the adjustment limits of the saw turntable rotational axis relative to the fence plane.

The fence is supported on a carriage having a linear guide across the turntable rotational axis and the linear guide is fixed in relation to the basic support for the saw and its turntable carriage. Engaging cam and follower elements of the saw turntable and fence carriage coact in reponse to turntable rotation to displace the work fence on a linear path in direct proportion to angular rotation of the saw turntable, so that the fence clearance gap is always in alignment with the rotating saw blade for any angular path of movement thereof during the cutting of workpieces which are held in engagement with the fence.

The invention finds particular utility in the center line cutting of members for roof trusses which necessitates the rotational axis of the saw turntable being displaced varying distance from the fence plane.

Other objects and advantages of the invention will become apparent during the course of the following description.

DETAILED DESCRIPTION

Figure 1:
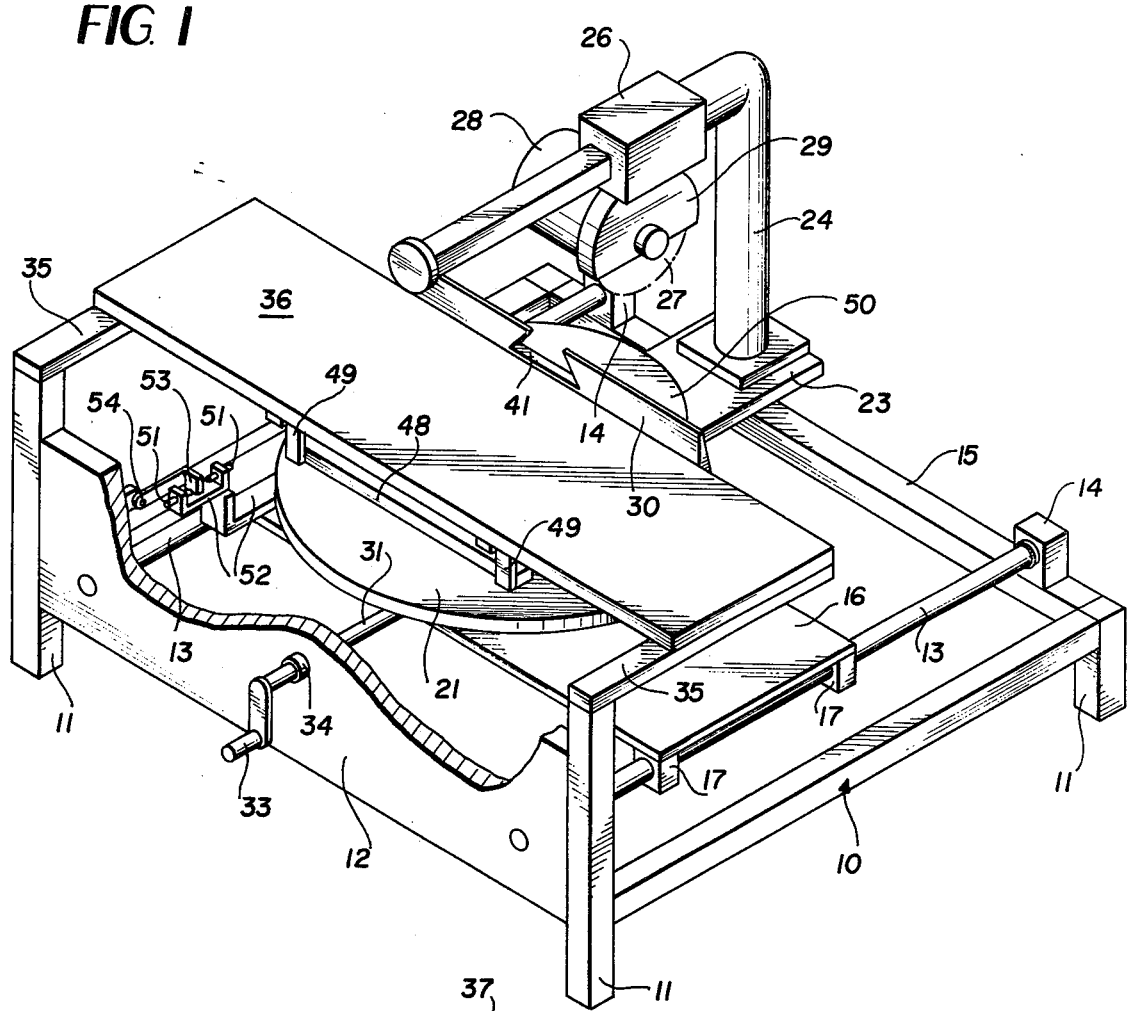
FIG. 1 is a perspective view of the invention, partly broken away and partly in section.

Referring to the drawings in detail wherein like numerals designate like parts, the numeral 10 designates a rigid horizontal rectangular frame having legs 11 and a forward vertical wall 12. A pair of spaced parallel longitudinal carriage guide rails 13 are disposed slightly above the top of frame 10 with corresponding ends thereof supported by the vertical wall 12 and their opposite ends supported in bearing blocks 14 rising from the rearward transverse bar 15 of support frame 10.

A saw carriage 16 is supported on the guide rails 13 through pairs of opposite side slide bearings 17 depending rigidly therefrom. The carriage 16 mounts centrally a bearing hub 18 fixed thereto and supporting ball bearings 19 within which a vertical axis short rotational shaft 20 for a horizontal turntable 21 is journaled for free rotation. The turntable vertical axis of rotation, namely, the axis of the shaft 20, is indicated at TR in drawing FIGS. 3 and 4.

The horizontal turntable 21, which is spaced above the carriage 16, includes a semi-circular portion 22 which may carry angular indicia, not shown, along its arcuate edge and on its top face also includes a reduced width rearward rectangular portion 23 forming the support for a vertical post 24 rising therefrom and fixed thereto. The top of vertical post 24 has rigidly attached thereto and cantilevered therefrom a horizontal arm or guideway 25 for the support of a radial arm saw carriage 26 carrying beneath it a circular saw blade 27 driven by a motor 28 and having a saw guard 29. The construction of the radial arm saw proper on the turntable 23 is conventional and need not be further described, it being understood that the post 24 and the saw are bodily mounted on the turntable 21 to turn therewith around the vertical axis of shaft 20.

Figure 2:
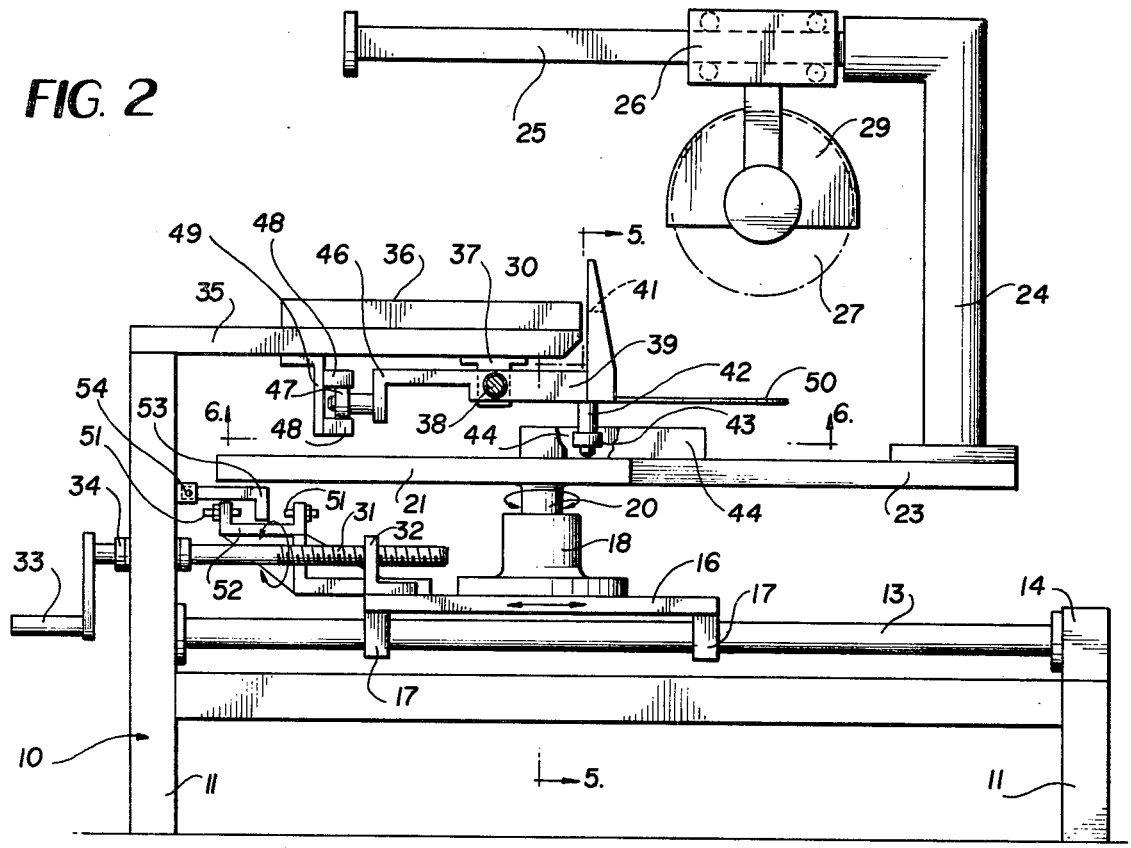
FIG. 2 is a side elevation of the invention.
Figure 5:
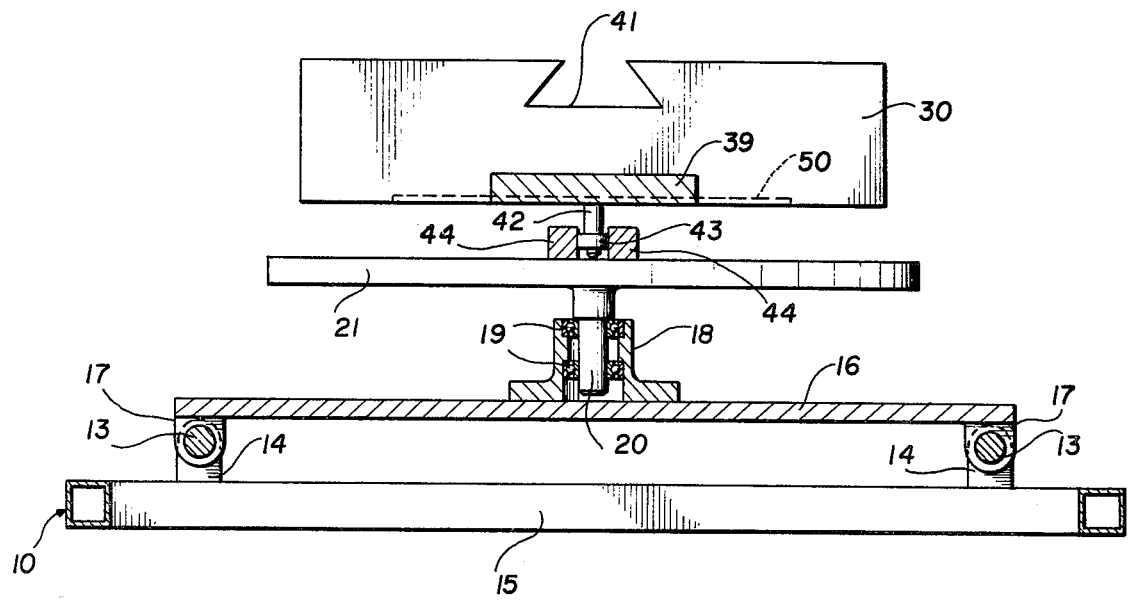
FIG. 5 is a vertical section taken on line 5—5 of FIG. 2.

The turntable and its shaft 20 is shiftable horizontally on the guide rails 13 toward and away from the vertical plane of a work fence 30, to be further described, by the operation of a horizontal screw shaft 31 having threaded engagement in an L-bracket 32 fixed to the top of carriage 16 near the forward edge thereof, FIG. 2. The screw shaft 31 has a hand crank 33 secured thereto outwardly of the vertical wall 12, the screw shaft also having a journal 34 fixed in the wall 12.

Figure 6:
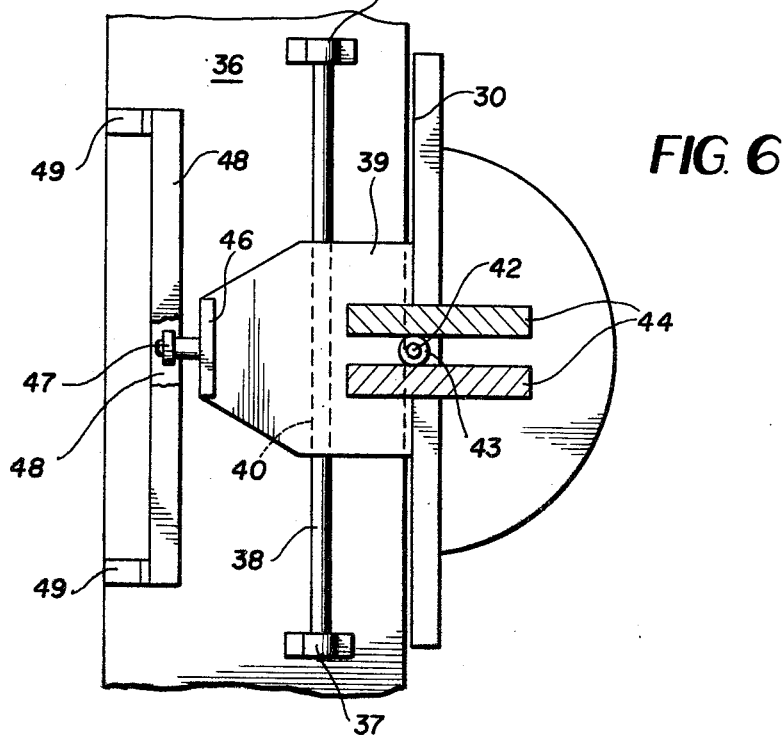
FIG. 6 is a horizontal section taken on line 6—6 of FIG. 2.

Upper extensions of the forward legs 11 carry horizontal support arms 35 for a horizontal transverse workpiece support plate or table 36. Dependingly secured to the fixed table 36 in spaced relation are bearings 37 for a horizontal transverse fence carriage guide bar 38 whose opposite ends are fixed within and supported by the bearings 37. A fence carriage 39 has a transverse through opening 40, FIG. 6, receiving the carriage guide rail 38 therethrough with suitable guide bushing means. The fence carriage 39 is shiftable back and forth horizontally and transversely of the guide bar 38 by means soon to be described. The fence carriage 39 is restrained by the single guide bar 38 from fore and aft movement along the axes of rails 13, the rails 13 being at right angles to the bar 38. Thus the two carriages 16 and 39 travel at right angles in different horizontal planes, FIG. 2.

The previously-noted vertical work fence 30 rises from the rear of carriage 39 and is fixed thereto and extends substantially above the top of horizontal work plate or table 36 and is provided centrally with the customary saw blade clearance gap 41.

Depending rigidly from the carriage 39 is a short carriage drive shaft 42 having a cam follower roller 43 thereon whose vertical axis is coincident with the vertical plane of work fence 30. The plane of work fence 30 is designated FP in both of FIGS. 3 and 4 and in these figures, as in FIG. 2, it may be noted that the axis of rotation TR of the turntable 21 is spaced significantly from the fence plane FP. By operating the screw shaft 31, this distance can be increased or decreased until the turntable rotational axis TR coincides with the fence plane FP.

Figure 3:
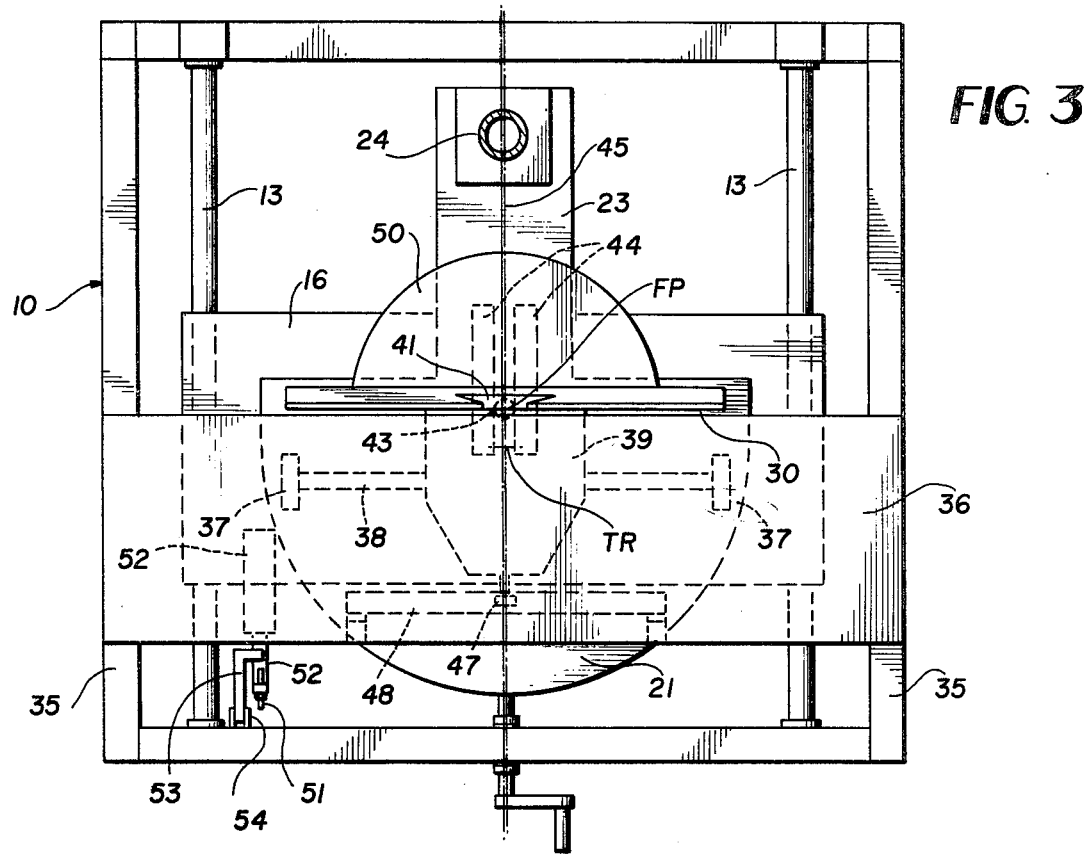
FIG. 3 is a plan view of the invention with the saw blade positioned in a neutral plane at right angles to the work fence.
Figure 4:
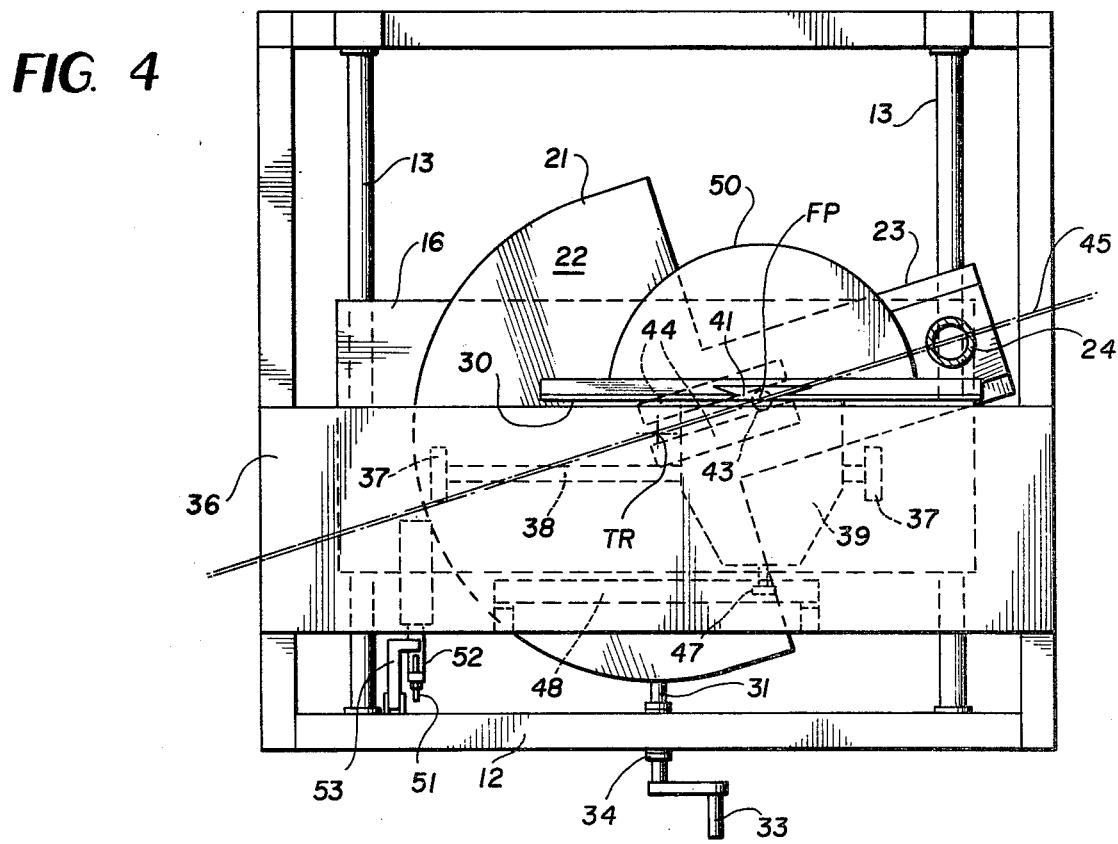
FIG. 4 is a further plan view of the invention with the saw blade swung to an extreme angular position relative to the fence and depicting the automatic adjustment of the fence in response to the angular movement of the saw blade.

A pair of straight parallel cam bars 44 fixed to the top of turntable 21 receive the cam follower roller 43 closely between them. Whenever the angle of the saw blade 27 is adjusted by rotating the turntable 21 on the axis of shaft 20 in either direction, the cam bars 44 are displaced with the turntable and act directly on the follower roller 43 to cause shifting of the fence carriage 39 longitudinally on the guide bar 38 in one direction or the other. FIG. 4 shows the turntable 21 swung to one extreme position and the straight cam bars 44 are correspondingly angled and the resulting movement of the follower roller 43 has shifted the fence 30 to the extreme right in FIG. 4 so that its gap 41 is in line with the path of saw blade 27, such path being indicated at 45. FIG. 3, on the other hand, shows the saw blade path 45 at right angles to the fence 30 and across the gap 41. The fence 30 is in a centered neutral position.

It will be understood that when the shaft 20 of the turntable 21 is adjusted by means of the screw shaft 31 to make it coaxial with the follower roller 43, and coincident with the plane FP, there will be no displacement of the fence 30 on the guide bar 38 in response to angular adjustment of the saw and turntable on the shaft 20. The amount of displacement of the fence 30 along the guide bar 38 is always in direct proportion to the distance between the axis of shaft 20, TR, and the plane of fence 30, FP. Stated another way, the automatic displacement of the fence 30 along the guide bar 38 is proportional to the tangent of the angle of rotation of the turntable on its shaft 20 from either side of neutral, FIG. 3.

A further means is provided in the invention to stabilize the fence and its carriage 39 during movement along the guide bar 38. A forward extension 46 of fence carriage 39 carries a horizontal axis guide roller 47 disposed between a pair of horizontal vertically spaced guide bars 48, fixed to support brackets 49 on the underside of work table 36. As the carriage 39 is shifted horizontally in either direction on the guide bar 38 under influence of cam bars 44 and follower 43, it is stabilized vertically by the guide roller 47 traveling between the bars or rails 48 which are spaced from the axis of guide bar 38 and parallel thereto.

The fence 30 has a rearward horizontal semi-circular plate extension 50 thereon closely above the cam bars 44 to protect them from sawdust and debris.

A further feature of the invention resides in the provision of opposing adjustable locator studs 51 secured to a support bracket 52 on opposite sides of a hinged stop 53 which can be raised at proper times on a hinge axis 54 to an inactive position. The locator studs 51 simply limit the extent of movement of the carriage 16 and hence the displacement of the turntable axis TR by the screw shaft 31. A series of such stops may be employed in practice to preset the turntable rotational axis to as many locations as required. For the purpose of illustration, a single pair of locator studs 51 only has been shown. The support bracket 52 is rigidly attached to the turntable carriage 16 near one side thereof.

In view of the foregoing description, the operation of the invention should be quite clear to those skilled in the art. The essence of the invention resides in the mechanism including the cam bars 44 on the turntable 21 which rotate therewith and act cammingly on the follower roller 43 to automatically shift the fence 30 on the horizontal guide bar 38 in either direction and in an amount directly proportional to the distance between the turntable axis of rotation and the plane of the fence 30. This critical distance is adjustable in the invention through the use of the screw shaft 31 or equivalent means. The adjustable studs 51 allow presetting of the turntable rotational axis locations. The movement of the fence 30 is entirely automatic and assures that the saw blade 27 will pass through the gap 41 of the fence in all angularly adjusted positions of the saw blade. In all other respects, the radial arm saw functions like any other saw of that type and another virtue of the invention is that it does not interfere in any way with the usage or versatility of the radial arm saw. The invention fully overcomes a very troublesome problem related to cutting through work fences in the absence of the invention, as discussed in the introductory portion of this application.

It is to be understood that the form of the invention herewith shown and described is to be taken as a preferred example of the same, and that various changes in the shape, size and arrangement of parts may be resorted to, without departing from the spirit of the invention or scope of the subjoined claims.

What we claim is:

1. In a radial arm saw, a supporting base, a carriage means on the base and being adjustable along a linear path relative to the supporting base, an upright axis turntable structure on the carriage means and bodily movable therewith and including a radial arm saw, a second carriage means on the supporting base is superposed relation to the first-named carriage means and turntable structure and being movable in a linear path across the path of movement of the first-named carriage means, a work-engaging fence fixed to the second carriage means and movable therewith along the second-named linear path, and coacting means on the turntable structure and second-named carriage means to drive the second-named carriage means and said fence along the second-named linear path in response to rotation of the turntable structure around said upright axis, the movement of the second-named carriage means and fence being proportional to the spacing between said upright axis and a plane in which the working face of said fence lies.

2. In a radial arm saw as defined in claim 1, and said coacting means comprising engaging cam and cam follower means.

3. In a radial arm saw as defined in claim 2, and said cam and cam follower means comprising a linear surface cam and a cam follower roller engaging the linear surface.

4. In a radial arm saw as defined in claim 1, guide rail means for the first-named carriage means on the supporting base, and drive means for the first-named carriage means on the supporting base and operable to move the first-named carriage means in opposite directions along said linear path.

5. In a radial arm saw as defined in claim 4, and adjustable limit stops on the first-named carriage means and said supporting base to preset the extent of travel of the first-named carriage means along said linear path.

6. In a radial arm saw as defined in claim 4, and said drive means comprising a rotary screw shaft on said supporting base having threaded engagement with an element on the first-named carriage means.

7. In a radial arm saw as defined in claim 1, and a workpiece supporting table fixedly mounted on said supporting base in superposed relationship to the second carriage means and adjacent to said fence, said fence rising above said table and having a saw blade gap formed therethrough.

8. In a radial arm saw as defined in claim 7, and a horizontal plate extension on said fence overlying said coacting means to protect the same from debris.

9. In a radial arm saw as defined in claim 1, and guide rail means for said second carriage means on said supporting base and extending across and at right angles to said linear path of the first-named carriage means.

10. In a radial arm saw as defined in claim 9, and stabilizing means for the second-named carriage means along its edge away from said fence and including interengaging fixed track and guide roller means on said supporting base and second-named carriage means.

11. In a radial arm saw, a supporting base, a saw turntable carriage on the supporting base and movable in opposite directions along a linear path, reversible driving means for said saw turntable carriage, a work fence carriage unit on said supporting base above said saw turntable carriage and movable in opposite directions along a linear path across and at right angles to the linear path of movement of the saw turntable carriage, and interengaging cam means on the saw turntable carriage and fence carriage unit and operable to drive the fence carriage unit automatically along the second-named linear path responsive to rotation of the saw turntable on the saw turntable carriage around an axis of rotation at right angles to the second-named linear path.

12. In a radial arm saw as defined in claim 11, and said interengaging cam means comprising a linear cam on said turntable, and a cam follower element on said work fence carriage unit.

* * * * *